United States Patent [19]

Hussain et al.

[11] Patent Number: 5,048,350

[45] Date of Patent: Sep. 17, 1991

[54] ELECTROMAGNETIC DRIVER AND SENSOR

[75] Inventors: Yousif A. Hussain, Coulsdon; Milos J. Machacek, Reigate, both of England

[73] Assignee: The Foxboro Company, Foxboro, Mass.

[21] Appl. No.: 446,310

[22] Filed: Dec. 5, 1989

[51] Int. Cl.$^5$ .................................. G01F 1/84
[52] U.S. Cl. ................................... 73/861.38
[58] Field of Search ............. 73/32 A, 861.37, 861.38; 335/252, 301, 236; 310/15, 17

[56] References Cited

U.S. PATENT DOCUMENTS

| | | | |
|---|---|---|---|
| 2,865,201 | 12/1958 | Roth | 73/861.38 |
| 3,142,788 | 7/1964 | Gelenius | 335/236 |
| 4,158,959 | 6/1979 | Blair | 73/30 |
| 4,233,583 | 11/1980 | Novacek | 335/236 |
| 4,468,972 | 9/1984 | Fisher et al. | 73/861.38 |
| 4,655,089 | 4/1987 | Kappelt et al. | 73/861.38 |
| 4,658,657 | 4/1987 | Küppers | 73/861.38 |
| 4,738,144 | 4/1988 | Cage | 73/861.38 |
| 4,747,312 | 5/1988 | Herzl | 73/861.38 |
| 4,759,223 | 7/1988 | Frost | 73/861.38 |
| 4,800,355 | 1/1989 | Takechi et al. | 335/301 |
| 4,895,031 | 1/1990 | Cage | 73/861.38 |

Primary Examiner—Herbert Goldstein
Attorney, Agent, or Firm—Fish & Richardson

[57] ABSTRACT

A shielded electromechanical device for use in a Coriolis type mass flowmeter for interconverting mechanical energy and electrical energy has a coil assembly connected to its distal end, and a magnetic assembly connected to its proximal end. The magnetic assembly is adapted to interact with the coil assembly. A shield assembly surrounds the coil and magnetic assemblies and is adapted to reduce the magnetic field exterior to said shield assembly.

25 Claims, 5 Drawing Sheets

ELECTROMAGNETIC DRIVER AND SENSOR

BACKGROUND OF THE INVENTION

The present invention relates to electromagnetic drivers for oscillating-conduit Coriolis-type mass flowmeters.

In response to the need to measure the quantity of material being delivered through pipelines, numerous types of flowmeters have evolved from a variety of design principles. One of the more widely used types of flowmeters is based on volumetric flow. Volumetric flowmeters are at best inaccurate in determining the quantity of material delivered, where the density of the material varies with temperature of feedstock or where the fluid being pumped through the pipe line is polyphase such as a slurry or where the fluid is non-Newtonian such as mayonnaise and other food products. In addition, chemical reactions, which are in effect mass reactions where proportions of reactants are critical, may be poorly served by volumetric flowmeters.

A mass flowmeter, on the other hand, is an instrument that provides a direct indication of the quantity of mass, as opposed to volume, of material being transferred through the pipeline. Various methods for measuring mass flow in a moving stream require application of a force to the stream and detecting and measuring some consequence of the applied force.

One class of mass measuring flowmeters is based on the well-known Coriolis effect. An exemplary Coriolis-type mass flowmeter is described in a co-pending U.S. patent application Ser. No. 923,847 filed Oct. 28, 1986, now U.S. Pat. No. 4,891,991 by Mattar et al., entitled "Coriolis-Type Mass Flowmeter" assigned to the assignee of the present invention and incorporated herein by reference in its entirety.

Many Coriolis-type mass flowmeters induce a Coriolis force by oscillating the pipe sinusoidally about a pivot axis orthogonal to the length of the pipe. In such a mass flowmeter, Coriolis forces are exhibited in the radial movement of mass in a rotating conduit. Material flowing through the pipe becomes a radially travelling mass which, therefore, experiences an acceleration. The Coriolis reaction force experienced by the travelling fluid mass is transferred to the pipe itself and is manifested as a deflection or offset of the pipe in the direction of the Coriolis force vector in the plane of rotation.

A major difficulty in these oscillatory systems is that the Coriolis force and, therefore, the resulting deflection is relatively small compared not only to the drive force but even to extraneous vibrations. On the other hand, an oscillatory system can employ the inherent bending resiliency of the pipe itself as a hinge or pivot point for oscillation that obviates the need for separate rotary or flexible joints, which improves mechanical reliability and durability. Moreover, an oscillatory system offers the possibility of using the resonant frequency of vibration of the tube itself to reduce the drive energy needed.

Energy is supplied to the tubes by a driving mechanism that oscillates the tubes by applying a periodic force. A typical type of driving mechanism is exemplified by an electromechanical driver, which exhibits motion proportional to a voltage applied across its coil. In an oscillating flowmeter the applied voltage is periodic and, generally, is sinusoidal. As mentioned above, the period of the input voltage, and hence, the driving force, is chosen to match the resonant frequency of the tube to reduce the energy needed to sustain the oscillation.

The Coriolis force resulting from the oscillation and the mass flow within the tube is measured by sensors also disposed on the flowmeter tube. In some cases it is desirable to place the sensors in close proximity to the driving mechanism. For example, in some systems this arrangement results in a more accurate determination of the Coriolis force exhibited by the flowmeter tube.

SUMMARY OF THE INVENTION

The general purpose of the invention is to improve the performance of electromagnetic drivers and sensors. A more specific goal is to eliminate magnetic cross-talk between a driver and a closely disposed sensor to improve the sensitivity of the driver/sensor combination.

These and other objects of the invention are achieved by various combinations of features disclosed herein. The claims appended hereto should be consulted for the scope of the invention.

According to the invention, a shielded electromechanical device for use in a Coriolis type mass flowmeter for interconverting mechanical energy and electrical energy includes a proximal end and a distal end, is adapted to move relative to the proximal end. A coil assembly is connected to the distal end, and a magnet assembly is connected to the proximal end. The coil assembly defines an interior cavity. A magnetic assembly comprises at least one magnetic member connected to the proximal end and has at least one magnetic member with a magnetic orientation aligned substantially with an axis connecting the proximal and distal ends. The magnetic assembly is disposed in the interior cavity and is adapted to interact magnetically with said coil assembly. A shield assembly surrounds the coil assembly, and the magnetic assembly is adapted to reduce the magnetic field exterior to said shield assembly.

In another embodiment of the invention, the shielded electromechanical device is adapted to convert mechanical energy into electrical energy. The mechanical energy is applied to the device by movement of the magnetic assembly relative to the coil assembly, and the coil assembly produces electrical energy in response to the mechanical movement.

In another embodiment, the shielded electromechanical device is adapted to convert electrical energy into mechanical energy. The electrical energy is applied to the coil assembly, and the magnetic assembly moves relative to the coil assembly in response to the electrical energy.

In another embodiment, the shield assembly further includes a proximal shield and a distal shield; the proximal shield is attached to the proximal end, and the distal shield is attached to the distal end of the electromechanical device.

In a preferred embodiment and as another aspect of the invention, one of the shields is adapted to fit within and move relative to the other of the shields.

In other embodiments, the shield assembly is made of a magnetically permeable material, such as steel.

In other embodiments, the magnetic assembly consists of a magnetic member. The magnetic orientation of the magnetic member is substantially aligned with an axis extending between the proximal and distal ends.

In a further embodiment, the magnetic assembly further includes a pole piece disposed adjacent said first magnetic member.

In other embodiments, the magnetic assembly further includes a second magnetic member. The magnetic orientation of the second magnetic member is substantially aligned with said axis extending between said proximal and distal ends.

In a related aspect, the magnetic orientations of said first and second magnetic members are oriented in opposite directions; the magnetic assembly further includes a pole piece disposed between the first and said second magnetic members. The pole piece is made from a high permeability material.

In other related aspects, the coil assembly defines an interior cavity with the magnetic assembly is disposed within the cavity. The coil assembly is substantially cylindrical and interacts magnetically with the magnetic assembly.

In another aspect of the invention, a Coriolis type mass flowmeter includes a support and a continuous loop of conduit solidly mounted at its inlet and outlet ends to the support. A shielded electromagnetic driver acts on the loop and oscillates the loop about an oscillation axis. A sensor is adapted to measure the magnitude of the Coriolis forces arising as a result of mass flow in the portion of the loop undergoing oscillatory motion. The shielded electromagnetic driver includes a proximal and distal end. A coil assembly is connected to the distal end, and a magnetic assembly is connected to the proximal end and is adapted to interact with the coil assembly. A shielded assembly surrounds the coil assembly and the magnetic assembly. The shield assembly is adapted to reduce the magnetic field exterior to the shield assembly.

In another embodiment, the sensor includes proximal and distal ends. A coil assembly is connected to the distal end and a magnetic assembly is connected to the proximal end and is adapted to interact with the coil assembly. A shield assembly surrounds the coil and magnetic assemblies and is adapted to reduce the magnetic field exterior to the shield assembly.

In further embodiments, the driver and sensor are juxtaposed on the loop. The flowmeter may include a second continuous loop of conduit solidly mounted at its inlet and outlet ends to the support. The first and second continuous loops of conduit are substantially parallel. The driver and sensor are disposed between the two loops.

In another embodiment of the invention, the flowmeter includes a second driver and a second sensor. The drivers drive the loop at different point along the loop about the oscillation axis.

In yet another embodiment of the invention, the portion of the loop between the pair of drivers is a substantially straight section.

DESCRIPTION OF THE PREFERRED EMBODIMENTS

We first briefly describe the drawings.

MECHANICAL DESIGN

A specific tubular configuration is described herein in a perpendicular orientation with respect to the direction of the process flow, i.e., the direction of flow in a straight section of pipeline in which the material is to be inserted. The invention is equally applicable to in-line and other tubular configurations. The implementations illustrated herein are designed for flowmeters for a variety of products including petroleum based fuels, for example. The flowmeter and electromechanical driver described herein are applicable, of course, to a wide variety of other specific designs for the same or different applications.

Figure 1:
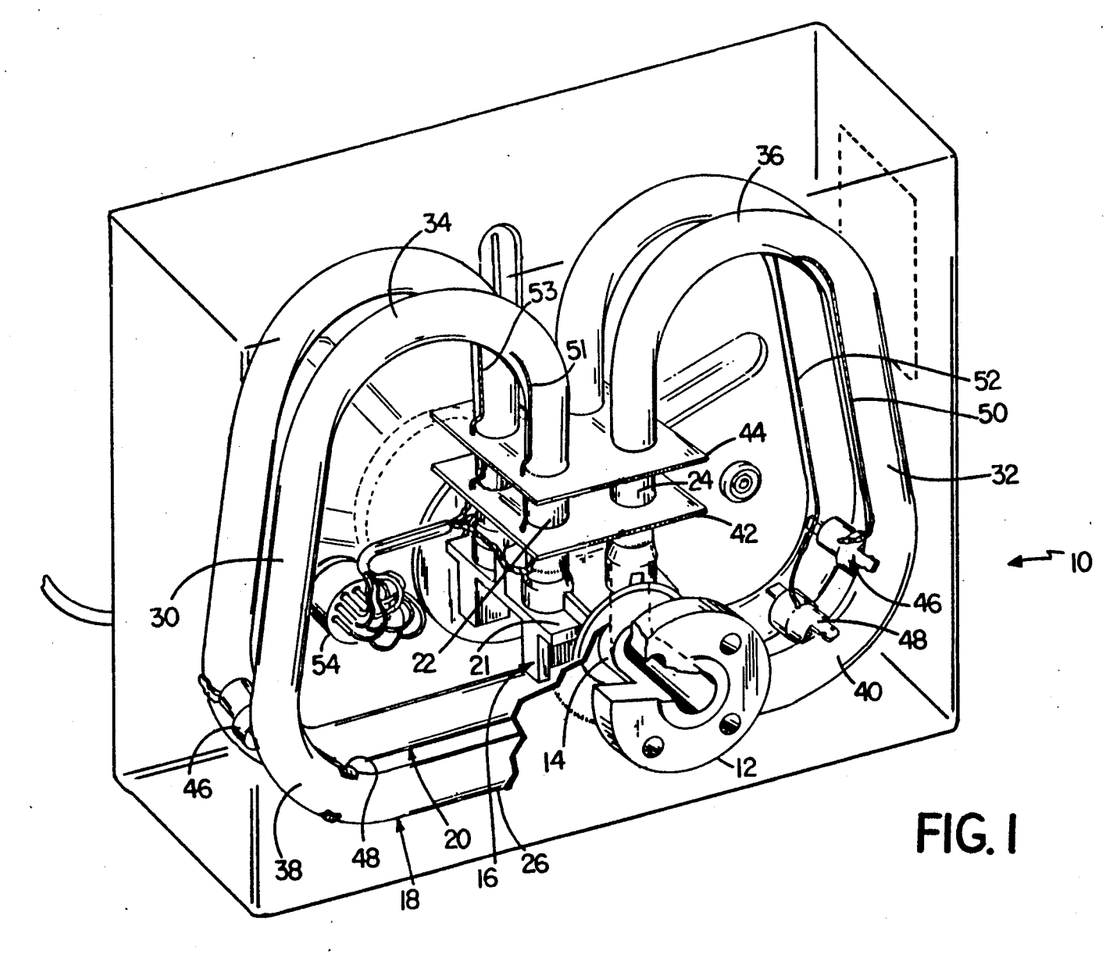
FIG. 1 is a perspective view of a Coriolis type mass flowmeter.

FIG. 1 illustrates a double loop, dual drive/detector system with mainly torsional loading of the tube ends where they are connected to a single rigid central manifold connected in line with the process flow. The same embodiment is shown in FIGS. 1 and 2.

Figure 2:
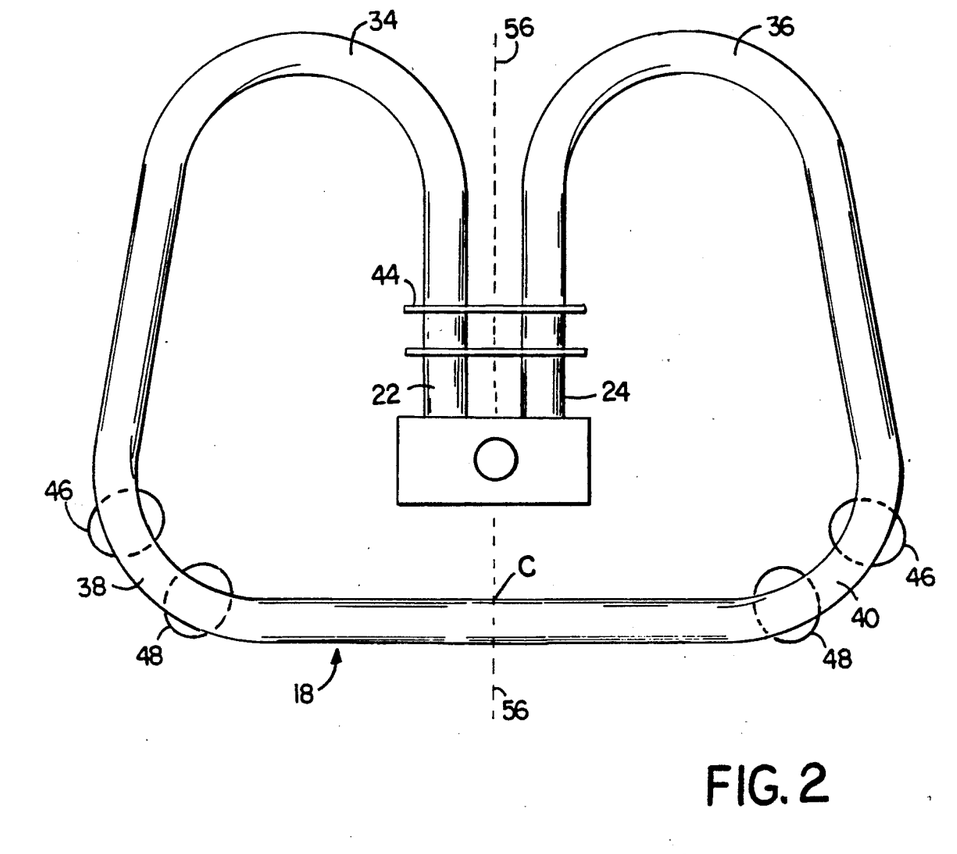
FIG. 2 is side schematic view of the apparatus of FIG. 1.

The mass flowmeter 10 of FIGS. 1 and 2 is designed to be inserted in a pipeline (not shown) which has had a small section removed or reserved to make room for the meter. The pipeline is equipped with opposing spaced flanges (not shown) which mate with mounting flanges 12 that are welded to short sections of pipe 14 connected to a central manifold block 16 supporting the two parallel planar loops 18 and 20. The configuration and shape of loops 18 and 20 are essentially identical. Thus, the description of the shape of loop 18 holds true for loop 20 as well, except where noted. Manifold block 16 is preferably a casting in the general shape of a solid rectangular block with a flat horizontal upper surface or top 21 and integral pipe sections 14. Various portions of the manifold block may be removed to reduce weight. The ends of loop 18 comprise straight, preferably vertical, parallel inlet and outlet sections or legs 22 and 24 securely affixed, e.g., by butt welding, to the top of the manifold surface 21 in close proximity to each other. The base of loop 18 is a long straight section 26 passing beneath the bottom face of manifold block 16. The long straight section 26 at the base of the loop 18 is connected to upright legs 22 and 24 by respective diagonal sections 30 and 32. The four junctions between the various straight segments of the loop 28 are rounded by large radii turns to afford as little resistance to flow as possible. In particular, upright legs 22 and 24 are connected to the respective diagonal segments 30 and 32 by means of apex turns 34 and 36. The ends of the long straight base section 26 are connected to the respective ends of the diagonal segments 30 and 32 by lower rounded turns 38 and 40.

The parallel inlet/outlet sections 22, 24 of both loops 18 and 20 pass through correspondingly apertured isolation plates or node plates 42 and 44 which are parallel to upper manifold surface 21 and spaced from the manifold surface by a predetermined distance. Welded to the tube, the node plates serve as stress isolation plates and define a common mechanical ground for each loop.

Electromechanical driver and detector assemblies are attached between loops 18 and 20 on each of the lower rounded turns 38 and 40. Each assembly consists of an electromagnetic driver 46 and sensor 48 disposed closely to each other, between the tubes 18 and 20. The electrical signals are transferred from driver and detection circuitry (not shown) to the drivers and sensors through wire leads 50-53 which run along the exterior of the tubes, through apertured isolation plates 42 and 44, and are connected to an electrical socket 54.

By energizing the driver pairs 46 on opposite ends of the tubes with current of equal magnitude but opposite sign (180 degrees out-of-phase), straight section 26 is caused to rotate about its co-planar perpendicular bisector 56 which intersects the tube at point c as shown in FIG. 2. The drive rotation is thus preferably in a horizontal plane about point c. The perpendicular bisectors for the straight sections of both loops preferably lie in a common plane of symmetry for both loops.

Repeatedly reversing (e.g., controlling sinusoidally) the energizing current of the drivers causes straight section 26 of loop 18 to execute an oscillatory motion in the horizontal plane about line 56—56. The motion of each straight section 26 sweeps out a bow tie shape. The entire lateral excursion of the loop at the lower rounded turns 38 and 40 is small, on the order of 1/16 of an inch for a two foot long straight section 26 for a one inch pipe. This displacement is coupled to the upright parallel legs 22 and 24 as torsional deflections about the axes of the legs 22 and 24 beginning at the node plate 44. Complementary oscillatory motion is induced in the straight section of the loop 20.

Figure 3:
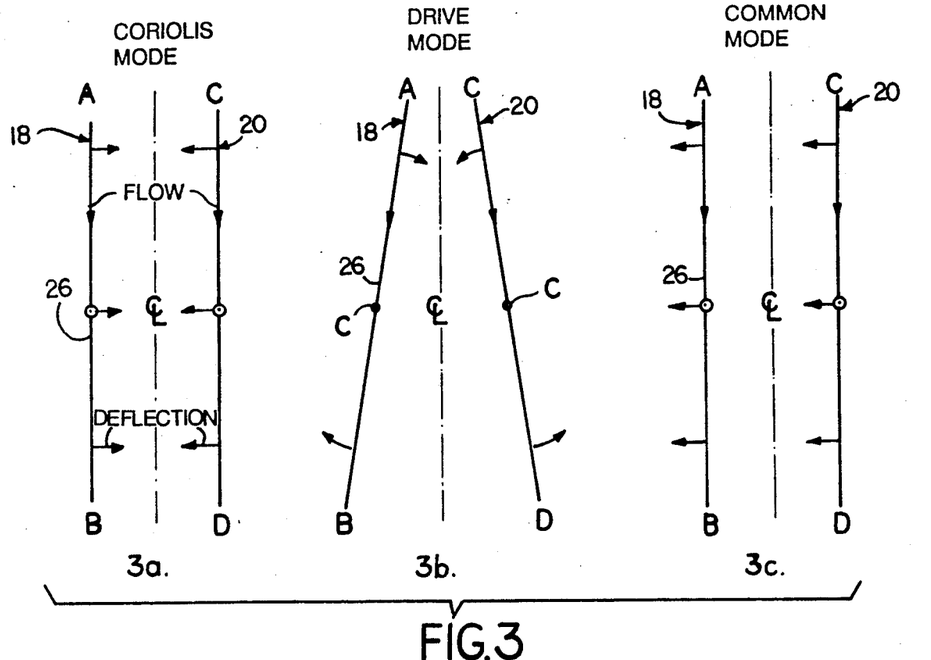
FIG. 3 is a schematic representation of three modes of motion of the apparatus of FIGS. 1 and 2.

The motions of the straight sections of loops 18 and 20 are shown in three modes in views a, b, and c in FIG. 3. In the drive mode as shown in view 3b, each conduit loop oscillates around a point c. The two loops rotate synchronously but in the opposite sense, i.e., while loop 18 rotates clockwise, loop 20 undergoes counterclockwise rotation. That is, the loops are driven 180° out-of-phase about their respective points c. Consequently, respective ends such as A and C as shown in FIG. 3 periodically come together and go apart. This type of drive motion induces Coriolis effects in the directions shown in view 3a. The Coriolis mode motion thus tends to move the whole planes of the loops 18 and 20. The Coriolis effect is greatest when the two straight sections 26 are parallel as shown in view 3a, because the sinusoidally varying angular velocity is then at its maximum. Because the Coriolis mode motion of each loop is in the opposite direction, the straight sections 26 move slightly toward (or away) from each other as shown in view 3a. A common mode motion, undesirable in this instrument, would be one which deflected the loops in the same direction as shown in view 3c. This type of motion might be produced by an axial wave in the pipeline itself in the embodiment of FIG. 1 because the loops are oriented perpendicular to the pipeline.

The sensors 48 detect the oscillatory motion of the straight sections of the tubes and output a signal that is representative of the oscillatory drive force modulated with the Coriolis reaction force exhibited by the fluid undergoing acceleration. Because of the close proximity of driver 46 and sensor 48, special precautions must be taken to prevent magnetic interlock from occurring. That is, the magnetic field from driver 46 may induce a voltage within the sensor 48 to give a spurious signal. It is preferred that a shielded driver and sensor be used to prevent magnetic interlock from occurring.

Shielded Driver

Figure 4:
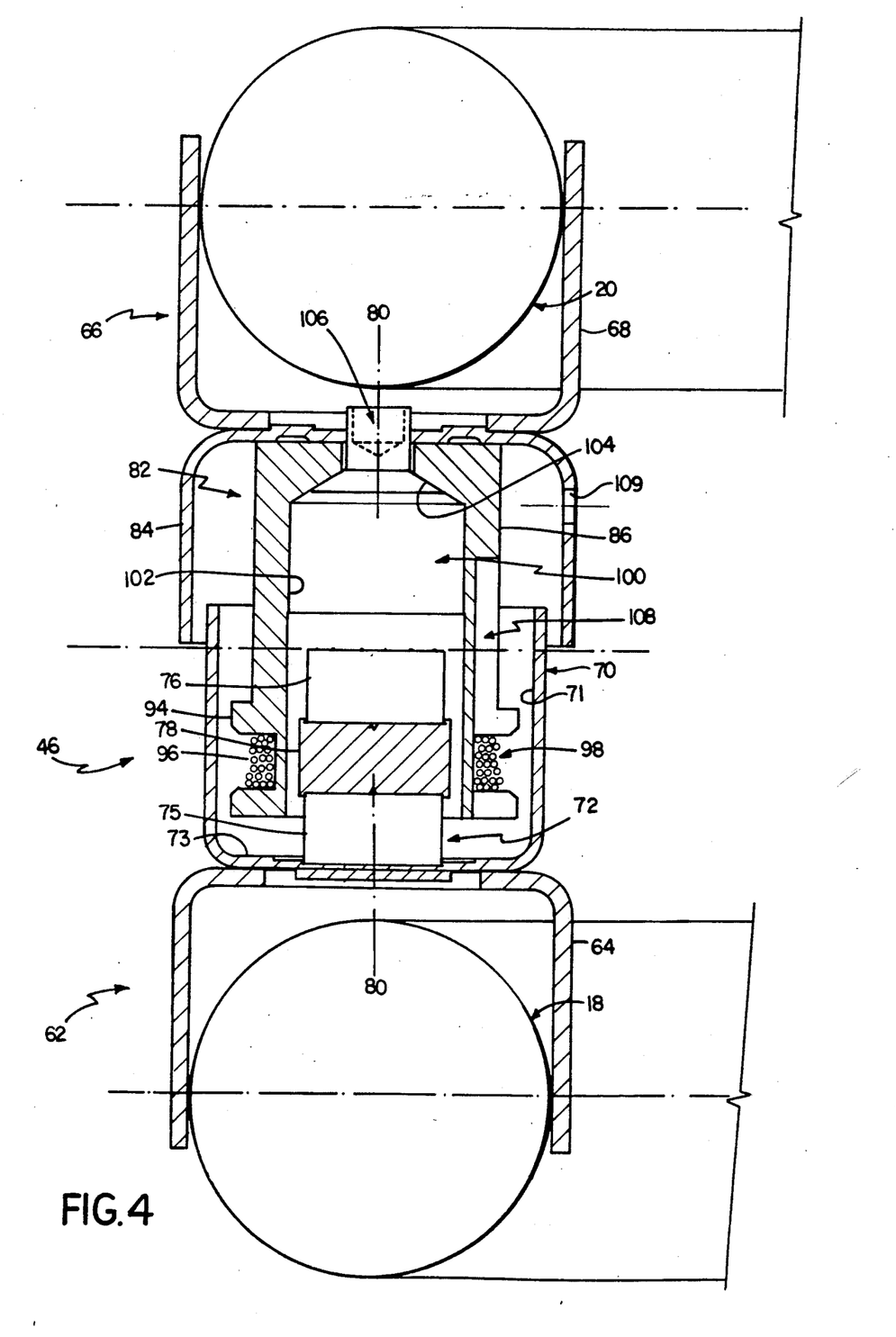
FIG. 4 is a sectional view of an electromechanical driver according to the invention.

With reference to FIG. 4, a driver assembly 46 of a preferred embodiment is shown. The shielded driver is designed to interconvert electrical and mechanical energy. Specifically, the driver efficiently converts electrical energy (i.e., electrical signals) into mechanical energy (that is, mechanical motion). Driver assembly 46 consists of a proximal end 62 attached to flow conduit 18 by a proximal mounting bracket 64 and a distal end 66 attached to flow conduit 20 by a distal mounting bracket 68.

Proximal end 62 consists of a magnetic assembly 72 disposed within a proximal shield 70. The proximal shield is made of soft carbon steel and is cup-shaped having a cylindrical wall 71 and flat bottom 73 that is attached to proximal mounting bracket 64. The dimensions of the proximal shield are determined by the size and shape of the overall driver assembly. The proximal shield 70 acts as a magnetic path return, helping to contain the magnetic flux within the magnetic assembly. Disposed in the center of shield 70 is elongated magnet assembly 72 having a pair of magnets 75 and 76 separated by a central pole piece 78. The magnetic orientations of the magnets lie along the axis 80—80 defined by the driver assembly and point in opposite directions. That is, the magnetic orientations of magnets 75 and 76 are antiparallel. In the embodiment shown in FIG. 4, the magnets are oriented with the north poles of each magnet facing central pole piece 78. It will be appreciated by those skilled in the art that other orientations may be used, such as the south poles of each magnet facing the central pole piece. The pole piece may be made of any magnetically susceptible material, as is known in the art. A preferred material is soft carbon steel. This arrangement of magnets 75, 76 and central pole piece 78 concentrates the magnetic flux to within a small region proximate the pole piece for maximum interaction with a coil assembly 82.

Distal end 66 of the driver assembly 60 consists of a coil assembly 82 disposed within a distal shield 84. The coil assembly comprises a coil carrier 86 which, on its distal end, is attached to distal shield 84 which is then attached to distal mounting bracket 68 by a nonmagnetic rivet 106 for connection to flow conduit 20. On the proximal end of the coil carrier 86, a bobbin 94 is integrally formed. The coil carrier can be made from a nonconducting material to minimize the formation of eddy currents on the carrier itself. The bobbin 94 has wire wound 96 therearound to form an electromagnetic coil 98. The coil and coil carrier define an interior cavity 100 having a generally cylindrical section 102 and a frustoconical distal portion 104 that tapers from cylindrical section 102 to accommodate rivet 106. The generally cylindrical interior cavity is of a size sufficient to allow free movement of the magnet assembly and to allow maximum interaction between the coil assembly and the magnetic field projected from the magnet assembly.

The proximal and distal shields are designed to move relative to each other and to minimize magnetic flux escape from the device. This is accomplished by forming the proximal and distal shields in a generally cylindrical overlapping shape such that one of the members can fit and move freely within the other. That is, the shields together form a telescoping arrangement wherein one of the shields fits within the other. In the embodiment shown in FIG. 4, the shielding members are cylindrical, and the proximal member has a smaller radius than the distal member and is adapted to fit within and move relative to the distal end along the axis 80—80 defined by the cylindrical shape of the shields. Together the shields minimize the leakage of magnetic flux from and into the device by providing a shielded and enclosed magnetic assembly. A cut (not shown) in the cylindrical surface of the distal shield can be used to prevent eddy current formation, which can increase magnetic flux. The absence of an external magnetic flux allows close placement of any number of drivers and sensors without the problem of magnetic interlock; the proximate drivers and sensors will not magnetically influence each other. Another benefit of this arrangement is the increase in linearity that results from the multiple magnet assembly. The movement of the proximal and distal ends relative to each other due to the driving current in the coil will not significantly alter the permanent magnetic field and consequently linear driving forces are achieved.

Figure 5:
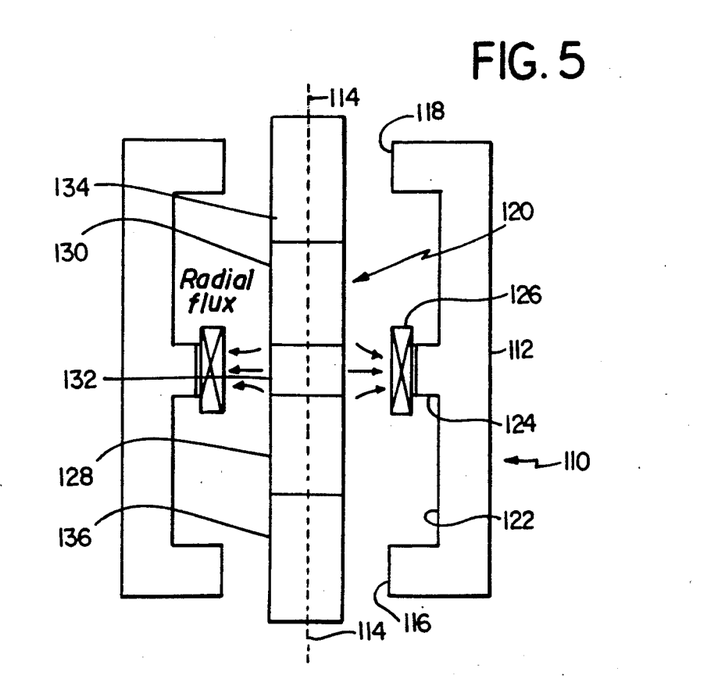
FIG. 5 is a schematic representation of an alternative embodiment of the electromechanical driver of FIG. 4.

With reference to FIG. 5, another embodiment of the electromagnetic driver is shown. The driver 110 consists of an elongated soft carbon steel shield 112 having a cylindrical cross section perpendicular to the member's axis 114—114. The shield has shoulder portions 116 and 118 that decrease the open area at each end of the shield and provide an opening through which an elongated magnetic member 120 moves. Located on the internal surface 122 of the shield is an annular ridge 124 projecting toward the center of the shield. An electromechanical coil 126 is mounted upon the annular ridge 124. Disposed centrally within the shield 112 is elongated magnetic member 120. Magnetic member 120 consists of two magnets 128 and 130 and three pole pieces 132, 134, and 136. Disposed on opposite sides of central pole piece 132 are two magnets 128 and 130 that have their magnetic orientations antiparallel, with respect to each other, and parallel to the axis 114—114 of the magnetic member. In the embodiment of FIG. 5, the north poles of each magnet 128 and 130 face each other. However, if desired, the south poles of each magnet may face each other. On the ends of each magnet 128, 130 opposite pole piece 122, are attached end pole pieces 134 and 136 respectively. Together pole pieces 132, 134, and 136 and magnets 128 and 130 form an elongated magnet assembly which exhibits high efficiency and linearity.

Electromagnetic Design

The design of the electromagnet device is based on the fact that maximum force should be provided from the driver with a minimum amount of current supplied to the coil. The equation governing the force is:

$$F = N \cdot I \cdot l \cdot B \tag{1}$$

where F = force (Newton),
N = number of coil turns,
l = coil average length per turn (meter),
I = coil current (amp), and
B = radial flux density (tesla).

In order to maximize B and still maintain the linearity of the force, two magnets should be used, connected back to back, with the pole pieces as shown in FIGS. 4 and 5. In these configurations the flux will be forced to merge radially in the region occupied by the coil. The air gaps between the pole pieces and the shield will not change while the permanent magnet is moving, which reduces the non-linearity of the design.

The embodiment of FIG. 5 consists of a soft carbon steel shell, 3 pole pieces, 2 permanent magnets and a coil. The aim of this embodiment is to focus the radial flux at the coil region and thus achieve maximum driving force for a given coil current.

A finite element analysis program was used to calculate the coil inductance as well as the average radial flux in the coil area. This model was then used to optimize the electromagnet design to achieve maximum force for a set amount of current. In the numerical model, the value used for the permeability of the soft carbon steel was 100, and that for the permanent magnet and air were 1. The remanence of the permanent magnet used was 0.9 tesla. The result of the calculation gave an average flux density of 477.2 millitesla. The coil inductance was also calculated by simulating the coil as a strip of permanent magnet located in the center of the assembly. The finite element program was run again to calculate the flux distribution due to the simulated coil. A regression program was then run to obtain a mathematical relation between the flux and the radial distance. A geometrical relation of the form $$y = k \, x^n \tag{2}$$

was used, where y is the flux, x is the distance, and k and n are constants to be fit by the regression program.

From equation 2 the average flux was calculated and the effective radial distance was determined. This effective distance was used to estimate the effective annular area of the coil flux ($A_m$) as well as the effective path length of the coil flux ($l_m$). From these two factors, the inductance (L) was then calculated $$L = N^2 \mu A_m / l_m \tag{3}$$

where N is the number of turns in the coil, and $\mu$ is the free space permeability. The result for FIG. 5 gave a value of 7.465 mH for N=450 turns.

In order to verify the modelling results, an electromagnetic device was built. The air gap between the pole pieces and the shell was replaced by a plastic tube that accommodated the coil and kept the assembly centered. A magnet wire was wound on this tube to make the assembly coil with a total of 450 turns. A small hole (i.e., FIG. 4, hole 109) was made in one end of the shell for inserting a hall effect probe for measuring the flux density. Two rare earth magnets were used with remanences of 0.85 to 0.93 tesla. The magnet dimensions were 20 mm in diameter and 10 mm in length. The maximum measure flux density was about 500 gauss. The inductance was 7.75 mH measured with an impedance bridge instrument. The experimental results were very close to those predicted by the finite element method and provided more confidence in the theoretical work.

An intrinsically safe mass flowmeter should have a low current limit in order to satisfy safety requirements so that this device will not be capable of igniting gas in a flammable environment. There are many factors that determine the value of the supplied current, such as coil inductance, resistance, barrier resistance, supply voltage, cabling characteristics, etc. In large Coriolis mass flowmeters, such as those having three inch diameter flow conduits, a large driving force is required if the tubes are thick and short (necessary for a compact design). This requires a high supplied current value which could violate the safety specification. The only alternative way to make the meter require a smaller force is to use long tubes with very thin walls. In this case the meter design will not be compact and will not be suitable for high pressure. Hence, the advantage of using the new design of the electromagnet device is apparent since it provides a large force with a small current and allows for construction of a relatively compact and sturdy device.

Shielded Sensor

Figure 6:
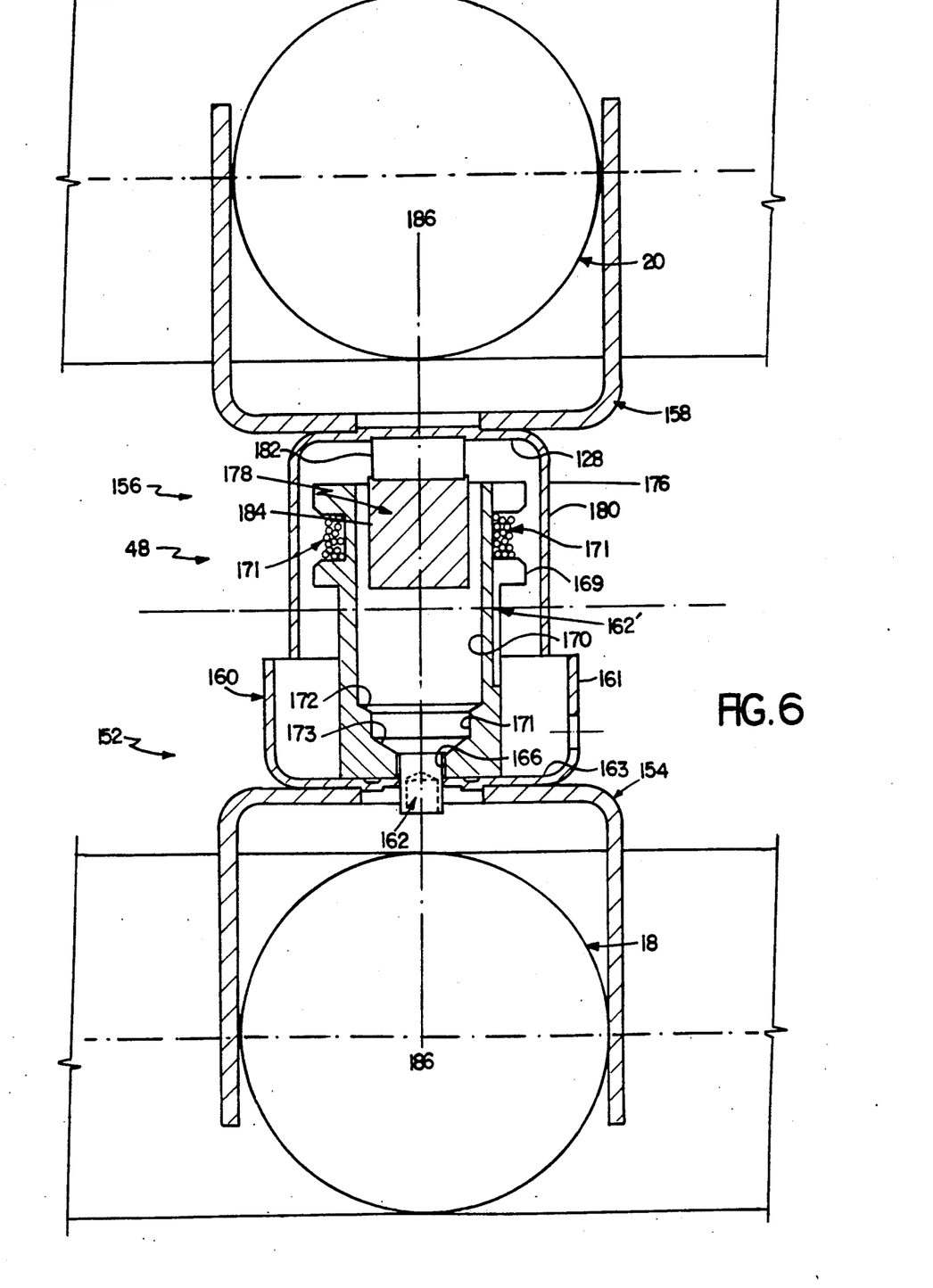
FIG. 6 is a sectional view of an electromechanical sensor according to the invention.

A shielded sensor assembly 48, which is similar to driver 46, is shown in FIG. 6. The shielded sensor assembly, like the shielded driver, is designed to interconvert electrical and mechanical energy. The sensor, however, efficiently converts mechanical energy (mechanical motion) into electrical energy (electrical signals), as opposed to the electromechanical driver. The shielded sensor assembly consists of a proximal end 152 attached to flow conduit 18 by a proximal mounting bracket 154, and a distal end 156 attached to flow conduit 20 by a distal mounting bracket 158.

Proximal end 152 consists of a coil assembly 162' positioned within a proximal shield 160 by a non-magnetic rivet 162. The shield is made of soft carbon steel and is cup shaped having a cylindrical wall 161 and a flat bottom 163 attached to proximal mounting bracket 154. The dimensions of the proximal shielding member is determined by the size and shape of the overall sensor assembly. On the distal end of the coil assembly is an integral bobbin 169 having wire wound therearound to form an electromagnetic coil 171. The coil assembly can be constructed from a nonmagnetic material to prevent the formation of eddy currents. The coil assembly defines an interior cavity having generally cylindrical portions 170, 171 and frustoconical portions 172, 173, which taper from cylindrical portion 170 to opening 166 to accommodate rivet 162. The generally cylindrical interior cavity is large enough to allow free movement of the magnet assembly, but small to allow maximum interaction between the coil assembly and the magnetic field projected from a magnet assembly.

Distal end 156 consists of a distal shielding member 176 and a magnetic assembly 178 disposed within the proximal shield. Shielding member 176 is made of soft carbon steel and is generally cup shaped having a cylindrical wall 180 and a flat bottom 182, which is attached to the distal mounting bracket 158. The dimensions of the distal shield are determined by the size and shape of the overall sensor assembly. Disposed in the center of shielding member 176 is an elongated magnet assembly 178 having a magnet 182 and pole piece 184. The magnetic orientation of the magnet lies along the axis 186—186 defined by the sensor assembly.

Like that of the shielded driver discussed above, the proximal and distal shielding members of the shielded sensor are designed to move relative to each other and to minimize magnetic flux escape out of and magnetic flux entrance into the device. This is accomplished by forming the proximal and distal shielding members in cylindrical shapes such that the shielding members together form a telescoping arrangement wherein one of the shielding members fits and moves within the other. In the embodiment shown in FIG. 6, the members are cylindrical and the distal shielding member has a smaller radius than the proximal shielding member and is adapted to fit within and move relative to the proximal shielding member along the axis. Together the shielding members minimize the leakage of magnetic flux of the device by providing a shielded and enclosed magnetic assembly. The absence of an external magnetic flux allows close placement of any number of drivers and sensors without the problem of interlock; the proximate drivers and sensors will not magnetically influence each other.

Many other modifications, additions and/or subtractions from the illustrated embodiments may be made without departing from the spirit or scope of the invention, which is indicated by the appended claim or equivalents thereto.

What is claimed is:

1. A shielded electromechanical device for use in a Coriolis type mass flowmeter for interconverting mechanical energy and electrical energy comprising:
   a proximal end and a distal end;
   a coil assembly connected to said distal end;
   a magnetic assembly connected to said proximal end adapted to interact with said coil assembly; and
   a shield assembly surrounding said coil assembly and said magnetic assembly, said shield assembly adapted to reduce the magnetic field exterior to said shield assembly, said shield assembly including a proximal shield attached to said proximal end and a distal shield attached to said distal end,
   wherein one of said shields is adapted to fit within and move relative to the other of said shields.

2. The shielded electromechanical device of claim 1 wherein said shield assembly comprises magnetically permeable material.

3. The shielded electromechanical device of claim 2 wherein said shield assembly comprises steel.

4. The shielded electromechanical device of claim 1 wherein said magnetic assembly comprises a magnetic member.

5. The shielded electromechanical device of claim 4 wherein the magnetic orientation of said magnetic member is aligned substantially with an axis extending between said proximal and distal ends.

6. The shielded electromechanical device of claim 4 wherein said magnetic assembly further comprises a pole piece disposed adjacent said first magnetic member.

7. The electromechanical device of claim 1 wherein said coil assembly defines an interior cavity, said magnetic assembly disposed within said cavity.

8. The shielded electromechanical device of claim 7 wherein said coil assembly is substantially cylindrical, interact magnetically with said magnetic assembly.

9. A shielded electromechanical device for use in a Coriolis type mass flowmeter for interconverting mechanical energy and electrical energy comprising:
   a proximal end and a distal end;
   a coil assembly connected to said distal end;
   a magnetic assembly connected to said proximal end adapted to interact with said coil assembly; and
   a shield assembly surrounding said coil assembly and said magnetic assembly, said shield assembly adapted to reduce the magnetic field exterior to said shield assembly,
   said magnetic assembly including first and second magnetic members, and a pole piece,
   said pole piece disposed adjacent said first magnetic member, and
   said second magnetic member disposed adjacent said pole piece.

10. The shielded electromechanical device of claim 9 wherein the magnetic orientation of said magnetic and said second magnetic members being aligned substantially with an axis extending between said proximal and distal ends.

11. The shielded electromechanical device of claim 10 wherein said magnetic orientations of said magnetic and second magnetic members are oriented in opposite directions.

12. The shielded electromechanical device of claim 11 wherein said magnetic and second magnetic members and said pole piece are disposed on said axis extending between said proximal and distal ends.

13. The shielded electromechanical device of claim 12 further comprising end pole pieces disposed adjacent each of said magnetic and second magnetic members, said end pole pieces disposed on said axis extending between said proximal and said distal ends.

14. The shielded electromechanical device of claim 13 wherein said pole piece and said end pole pieces comprise a high permeability material.

15. The shielded electromechanical device of claim 13 high permeability material is steel.

16. A Coriolis type mass flowmeter comprising:
a support;
a continuous loop of conduit solidly mounted at its inlet and outlet ends to the support;
a shielded electromagnetic driver acting on said loop for oscillating said loop about an oscillation axis, said shielded electromagnetic driver comprising
 a. a proximal end and a distal end,
 b. a coil assembly connected to said distal end,
 c. a magnetic assembly connected to said proximal end adapted to interact with said coil assembly, and
 d. a shield assembly surrounding said coil assembly and said magnetic assembly, said shield assembly adapted to reduce the magnetic field exterior to said shield assembly; and
a sensor adapted to measure the magnitude of Coriolis forces arising as a result of mass flow in the portion of said loop undergoing oscillatory motion, said sensor comprising:
a proximal end and a distal end;
a coil assembly connected to said distal end;
a magnetic assembly connected to said proximal end adapted to interact with said coil assembly; and
a shield assembly surrounding said coil assembly and said magnetic assembly, said shield assembly adapted to reduce the magnetic field exterior to said shield assembly,
wherein said driver and said sensor are juxtaposed on said loop.

17. The Coriolis type mass flowmeter of claim 16 further comprising a second continuous loop of conduit solidly mounted at its inlet and outlet ends to the support.

18. The Coriolis type mass flowmeter of claim 17 wherein said loop and said second loop are substantially parallel.

19. The Coriolis type mass flowmeter of claim 17 wherein said driver and sensor are disposed between said loop and said second loop.

20. The Coriolis type mass flowmeter of claim 19 wherein the proximal ends of said driver and sensor are connected to one of said loops and the distal ends of said driver and sensor are connected to the other of said loops.

21. A Coriolis type mass flowmeter comprising:
a support;
a continuous loop of conduit solidly mounted at its inlet and outlet ends to the support;
a shielded electromagnetic driver acting on said loop for oscillating said loop about an oscillation axis, said shielded electromagnetic driver comprising
 a. a proximal end and a distal end,
 b. a coil assembly connected to said distal end,
 c. a magnetic assembly connected to said proximal end adapted to interact with said coil assembly, and
 d. a shield assembly surrounding said coil assembly and said magnetic assembly, said shield assembly adapted to reduce the magnetic field exterior to said shield assembly; and
a sensor adapted to measure the magnitude of Coriolis forces arising as a result of mass flow in the portion of said loop undergoing oscillatory motion, said sensor comprising:
a proximal end and a distal end;
a coil assembly connected to said distal end;
a magnetic assembly connected to said proximal end adapted to interact with said coil assembly; and
a shield assembly surrounding said coil assembly and said magnetic assembly, said shield assembly adapted to reduce the magnetic field exterior to said shield assembly,
said Coriolis type mass flowmeter further comprising
a second continuous loop or conduit solidly mounted at its inlet and outlet ends to the support,
wherein said driver and sensor are disposed between said loop and said second loop,
wherein the proximal ends of said driver and sensor are connected to one of said loops and the distal ends of said driver and sensor are connected to the other of said loops,
wherein said driver and sensor are juxtaposed.

22. A Coriolis type mass flowmeter comprising:
a support;
a continuous loop of conduit solidly mounted at its inlet and outlet ends to the support;
a shielded electromagnetic driver acting on said loop for oscillating said loop about an oscillation axis, said shielded electromagnetic driver comprising
 a. a proximal end and a distal end,
 b. a coil assembly connected to said distal end,
 c. a magnetic assembly connected to said proximal end adapted to interact with said coil assembly, and
 d. a shield assembly surrounding said coil assembly and said magnetic assembly, said shield assembly adapted to reduce the magnetic field exterior to said shield assembly; and
a sensor adapted to measure the magnitude of Coriolis forces arising as a result of mass flow in the portion of said loop undergoing oscillatory motion, said sensor comprising:
a proximal end and a distal end;
a coil assembly connected to said distal end;
a magnetic assembly connected to said proximal end adapted to interact with said coil assembly; and
a shield assembly surrounding said coil assembly and said magnetic assembly, said shield assembly adapted to reduce the magnetic field exterior to said shield assembly,
said Coriolis type mass flowmeter further comprising a second driver and a second sensor, said drivers driving said loop at different points along the loop about said oscillation axis.

23. The Coriolis type mass flowmeter of claim 22 wherein the portion of said loop between said pair of drivers is a substantially straight section.

24. A Coriolis type mass flowmeter comprising:
a support;

two continuous parallel conduit loops, each solidly mounted at its inlet and outlet ends to the support;

a shielded electromagnetic driver disposed between said loops acting on said loops for oscillating said loops about respective oscillation axes, said shielded electromagnetic driver comprising a. a proximal end attached to one of said loops, and a distal end attached to the other of said loops, b. a coil assembly connected to said distal end, c. a magnetic assembly connected to said proximal end adapted to interact with said coil assembly, and d. a shield assembly surrounding said coil assembly and said magnetic assembly, said shield assembly adapted to reduce the magnetic field exterior to said shield assembly, said shield assembly including a proximal shield attached to said proximal end and a distal shield attached to said distal end, wherein one of said shields is adapted to fit within and move relative to the other of said shields; and a sensor adapted to measure the magnitude of Coriolis forces arising as a result of mass flow in the portion of said loop undergoing oscillatory motion.

25. The Coriolis type mass flowmeter of claim 24 wherein said sensor comprises:

a proximal end and a distal end;

a coil assembly connected to said distal end;

a magnetic assembly connected to said proximal end adapted to interact with said coil assembly; and a shield assembly surrounding said coil assembly and said magnetic assembly, said shield assembly adapted to reduce the magnetic field exterior to said shield assembly.

* * * * *